United States Patent

[11] 3,542,297

| [72] | Inventor | Billy L. Wyrick<br>Rte. 1, Box 592, Calhoun, Louisiana 71225 |
|---|---|---|
| [21] | Appl. No. | 774,074 |
| [22] | Filed | Nov. 7, 1968 |
| [45] | Patented | Nov. 24, 1970 |

[54] APPARATUS FOR SPREADING CHICKEN FERTILIZER AND LITTER THEREOF
1 Claim, 4 Drawing Figs.

[52] U.S. Cl. ........................................... 239/672, 239/679
[51] Int. Cl. ......................................... E01c 19/20
[50] Field of Search .................................. 239/672, 679

[56] References Cited
UNITED STATES PATENTS

| 864,863 | 9/1907 | Samuelson | 222/176 |
|---|---|---|---|
| 2,550,303 | 4/1951 | Simpson | 222/176 |
| 2,602,669 | 7/1952 | Givenrod | 222/176 |
| 2,632,651 | 3/1953 | Rittenhouse | 239/661 |
| 2,701,664 | 2/1955 | Thompson | 222/176 |
| 2,741,401 | 4/1956 | Kehres et al. | 222/136 |
| 2,800,252 | 7/1957 | Wahl | 222/55 |
| 3,038,729 | 6/1962 | Stokland | 239/687 |
| 3,188,094 | 6/1965 | Johnston | 239/672 |

Primary Examiner—Lloyd L. King
Assistant Examiner—Gene A. Church
Attorney—Semmes and Semmes ABSTRACT: A machine for broiler house and commercial chicken fertilizer spreading, characterized by the controlled combination of hopper, unique flatbed feeding and rotating conveyor distributor wherein the feed flow is regulated from the hopper by novel means.

Patented Nov. 24, 1970 3,542,297

INVENTOR
BILLY L. WYRICK

BY Semmes and Semmes
ATTORNEYS

Patented Nov. 24, 1970

3,542,297

INVENTOR
BILLY L. WYRICK

BY *Semmes and Semmes*

ATTORNEYS

APPARATUS FOR SPREADING CHICKEN FERTILIZER AND LITTER THEREOF

BACKGROUND OF THE INVENTION

1. Field of the Invention

The invention is particularly adapted to the dissemination of litter and droppings from chicken broiler houses which usually comprise either wood sawdust wood shavings or crushed peanut hulls as bedding. It is adapted to either broiler house fertilizer or commercial fertilizer, commercial being in either natural or pellet form. By this invention one can spread a selected very light or heavier coat of chicken fertilizer, as desired.

2. Description of the Prior Art

The known prior art comprises the following:
Simpson, U.S. Pat. No. 2,550,303; Givenrod, U.S. Pat. No. 2,602,669; Rittenhouse, U.S. Pat. No. 2,632,651; Thompson, U.S. Pat. No. 2,701,664; Kehres, U.S. Pat. No. 2,741,401; and Stokland, U.S. Pat. No. 3,038,729.

Whereas the expedient of employing endless belt feeders is illustrated in Givenrod and Thompson patents and the concept of rotatable disc distribution is found in Simpson and Rittenhouse, Simpson also indicating feeding control using spring-pressurized rods, the present invention involves the implementation of an unique hopper flatbed and conveyor system, combined with adjustable feedgate and distribution control.

DESCRIPTION OF THE PREFERRED EMBODIMENTS

Figure 3:
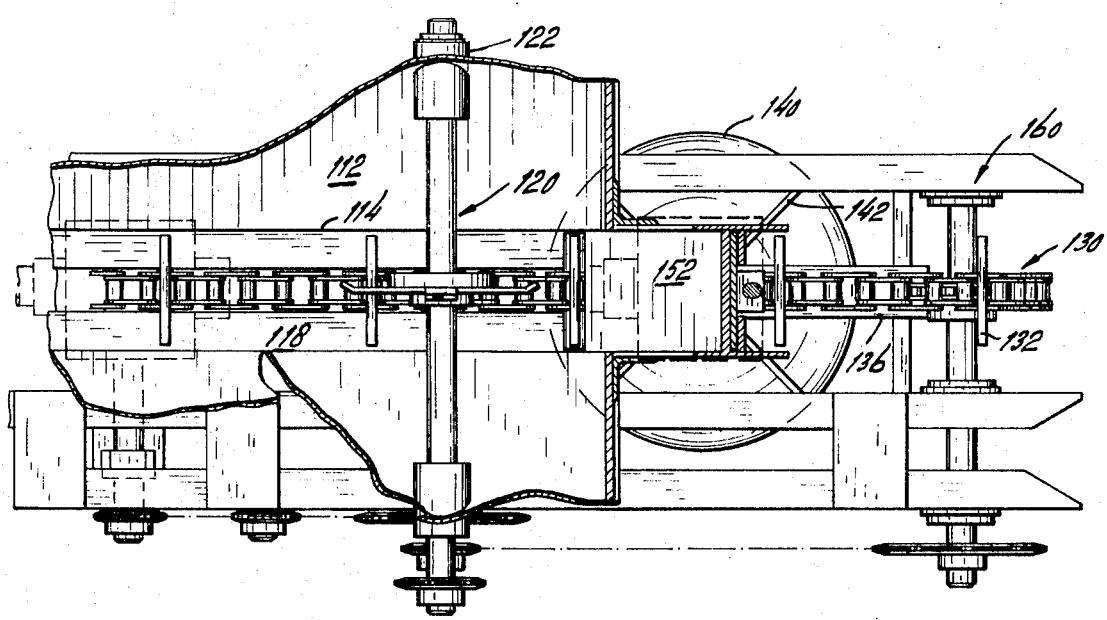
FIG. 3 is an enlarged fragmentary view of invention in horizontal section, taken along the lines 3–3 of FIG. 1.
Figure 4:
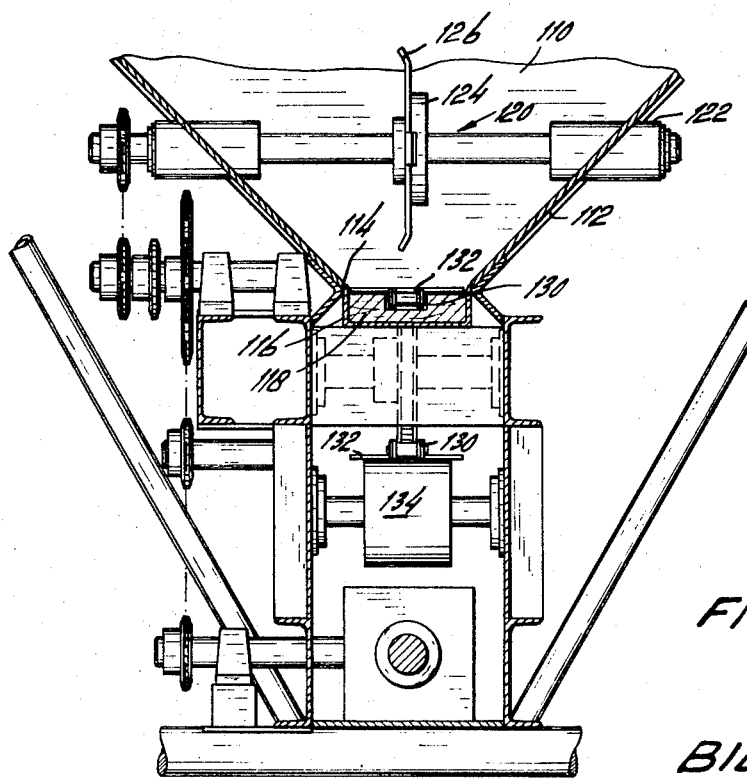
FIG. 4 is an enlarged vertical sectional view in fragment of a portion of invention taken along the lines 4–4 of FIG. 1.

Referring to the drawings, the spreader 100 includes elongated hopper 110 mounted on frame 160, said hopper having sides 112 terminating at the bottom in a flatbed trough 114, the trough being enclosed by a longitudinal keyway 116 in which is mounted an elongated bearing 118, said bearing being coextensive with the hopper and adapted to receive, in supporting relation, the chain 130 with its attached drags as indicated, reference FIGS. 3 and 4. A fertilizer agitator 120 is journal mounted as at 122 in the sides 112 of the hopper, said agitator being disposed in vertical alignment with the apex of the hopper and in alignment with the path of the chain 130 passing therethrough.

The chain 130 includes plural transverse fixed drags each of which is adapted to ride above the flat surface of the bearing 118, the chain itself resting in the bearing trough of the floor 118. The drags disturb and carry portions of the manure load from front to rear for agitation and disposition and eventual gravitational flow onto the concave disc 140 for distribution.

Figure 1:
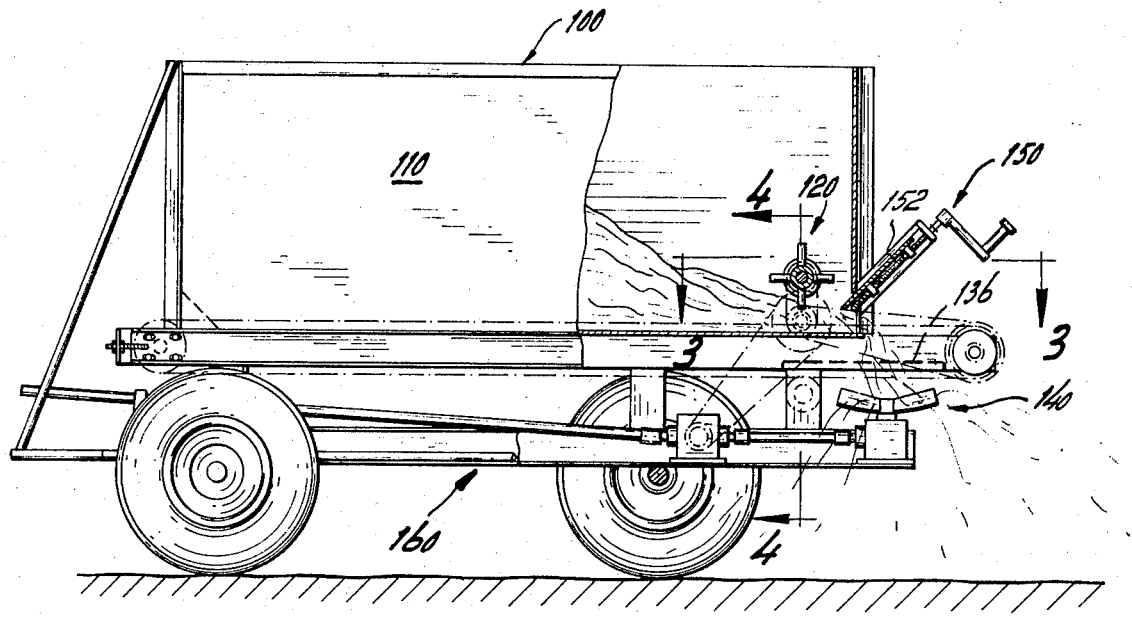
FIG. 1 is a view in side elevation of invention, the after portion thereof being broken away.
Figure 2:
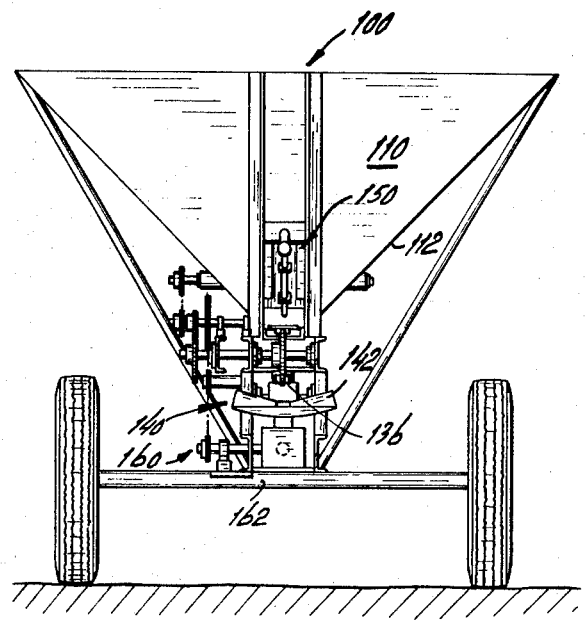
FIG. 2 is a rear end elevation of invention.

Means for regulating the flow is indicated in FIG. 1 at 150, this comprising an adjustable feeder gate 152, best indicated in its relationship to the chain 130 at FIG. 3. It is noteworthy that the gate 152 is disposed at an acute angle with respect to the horizontal directional movement of the chain and drag 150—152.

In operation, chain 130 with its drags 132 is return supported by the idler 134 and suitable chain tightening idlers are disposed along the length of the frame. Each of the respective units is sprocket driven by chain connection with the power takeoff system 160. In practice, the drags 132 are most useful in the spread dispensing of broiler house fertilizer whereas for commercial fertilizer the chain alone may be used without lugs, each of the respective system being adapted to load shift the manure from front to rear, while simultaneously agitating same immediately adjacent the discharge opening and in regulatory control by adjustable disposition of the discharge gate 152, said gate being in vertical controllable relation with respect to the spreader disc 140, which said disc is provided with fins 142 for centrifugal ejection of the deposited litter by virtue of the cooperative agitator conveyor action. The peculiar relation in angular disposition of gate assembly 150 is such as to insure that the loaded fertilizer will be contained within the hopper as the machine is stationery. See also the angular disposition of the corresponding forward hopper element connecting floor and forward wheel. Conveyor 130 having passed the zone of deposit is returned via the after drive system shown, the same having been retained in load tension theretofore, which said tension may be further adjusted by conventional idler means shown and supported as at 134. For the return support, the chain is shielded as at 136 against fowling in the discharge zone.

With these and other objects in view, the invention is defined by the appended claims.

I claim:

1. In a power-driven manure-spreading vehicle having frame and wheel support, the improvement in conveyance and spreading means, comprising:
   A. an elongate hopper mounted on the frame, said hopper including a flatbed, a portion of which defines a recess longitudinally medially of the hopper;
   B. movable endless conveyor means at least coextensive with the flatbed, movable in working part in the recess of the flatbed, said conveyor being of chain link construction having longitudinally spaced lateral bars which in cross section dimensions are substantially equivalent to the recess of the flatbed, said conveyor extending from the front of said flatbed out through the discharge end thereof to a point longitudinally spaced from the discharge end, and including:
      i. a fixed shield disposed above the return path of the conveyor substantially coextensive with the length thereof and beneath the flatbed of the hopper;
   C. rotary manure agitating means supported upon a horizontal axis within the hopper in cooperative superposed relationship to the conveyor;
   D. inclined adjustable discharge gate means supported at the discharge end of the hopper and inclined toward said conveyor in line with the flatbed thereof;
   E. rotary dispensing means positioned upon a vertical axis beneath said gate and beneath the moving path of said conveyor, said dispensing means being of convex configuration and including fixed ratial fence, said dispensing means being disposed immediately adjacent the gate and under the path of the conveyor; and
   F. means to drive the conveyor, agitating and rotary dispensing means.